Dec. 8, 1925.
J. E. BOWER
1,564,318
GEARING
Filed June 29, 1921
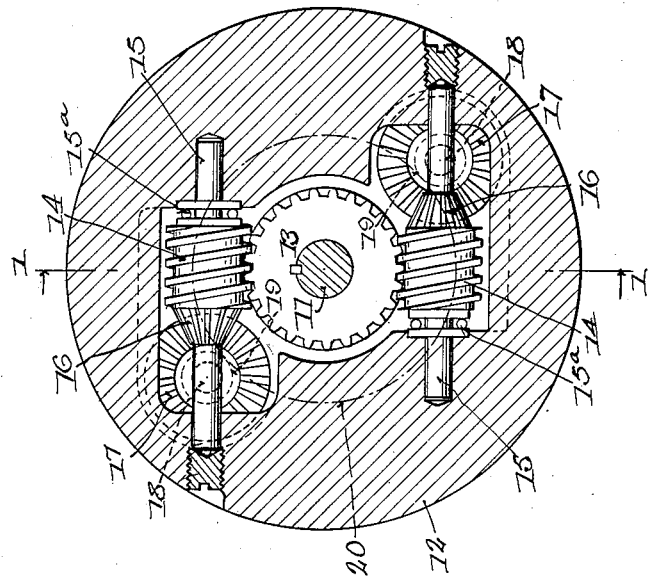
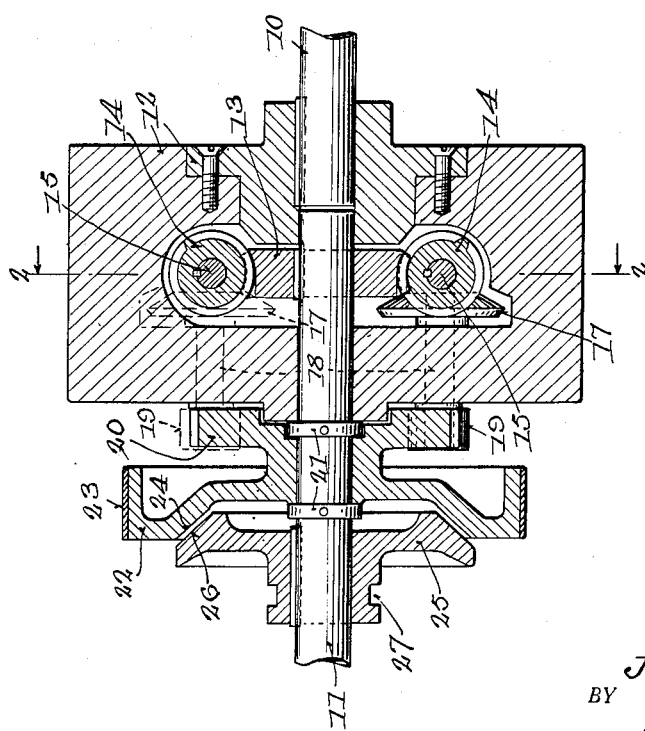
INVENTOR.
JOSEPH E. BOWER
BY
Ralph W. Brown.
ATTORNEY.

Patented Dec. 8, 1925.

1,564,318

UNITED STATES PATENT OFFICE.

JOSEPH E. BOWER, OF DANCY, WISCONSIN.

GEARING.

Application filed June 29, 1921. Serial No. 481,181.

*To all whom it may concern:*

Be it known that I, JOSEPH E. BOWER, a citizen of the United States, residing at Dancy, in the county of Marathon and State of Wisconsin, have invented a certain new and useful Improvement in Gearing, of which the following is a full, clear, concise, and exact description, reference being had to the accompanying drawings, forming a part of this specification.

This invention relates to power transmission mechanism.

One object of the present invention is the provision of an improved clutch mechanism for releasably connecting a driving and driven shaft.

Another object of the invention is a provision of an improved power transmission mechanism for controlling relative rotation between a driving and driven shaft whereby various speed ratios between the two shafts may be readily obtained.

Another object is the provision of an improved power transmission mechanism adapted to be controlled by a single brake mechanism and by which two definite speed ratios between a driving and driven shaft may be effected and positively maintained.

Other objects and advantages will later appear.

An embodiment of the invention is more or less diagrammatically illustrated in the accompanying drawings, in which:

Figure 1 is a longitudinal sectional view of a transmission mechanism constructed in accordance with the present invention.

Figure 2 is a sectional view taken substantially on the line 2—2 of Figure 1.

For convenience of illustration and explanation, the invention is shown and will be described as embodied in power transmission mechanism designed for use in motor vehicles, although its use in various other relations is contemplated.

The power transmission mechanism illustrated in Figures 1 and 2 is employed for controlling relative rotation between the two shafts 10 and 11, which, for the sake of convenience and clearness, will be hereinafter referred to as the driving and driven shafts, respectively. Either may be used as the driving shaft, however, and the other the driven shaft. Shaft 10 carries a body member 12 keyed or otherwise fixed thereto. When used as a part of a motor vehicle equipment, the member 12 may serve as an engine fly-wheel. The member 12 is preferably hollowed out in order to form a housing or casing for enclosing the gears, which will be hereinafter described.

Shaft 11 is preferably arranged in alignment with the shaft 10 and journaled for rotation in the member 12. A worm wheel 13 within the member 12 is keyed or otherwise fixed to the shaft 11 for rotation therewith. Worm wheel 13 meshes with a pair of worms 14 mounted preferably on opposite sides thereof upon fixed stub shafts 15 secured within and carried by the member 12. A thrust bearing 16, of any standard or approved construction, is preferably provided for each worm. Thus, it will be seen that relative rotation between the worm wheel 13 and the body member 12 may be nicely controlled by controlling the rotation of the worms 14.

Rotation of the worms 14 about their respective shafts 15 may be controlled in various ways. In the transmission mechanism illustrated in Figures 1 and 2, this is accomplished by means which will now be described. A small bevel pinion 16 is associated with each worm. Each pinion 16 is fixed to or made an integral part of a worm as shown. Each pinion 16 meshes with a bevel gear 17 keyed or otherwise fixed to a shaft 18 journaled in and carried by the body member 12. Fixed to the other end of each shaft 18 is a small pinion 19, both of which mesh with a large gear 20 mounted for rotation about the shaft 11. Any appropriate means, such as fixed collars 21, may be provided for maintaining the gear 20 in proper position on the shaft 11. Thus it will be seen that any relative rotation of the gear 20 and the member 12 will cause a rotation of the pinions 19, shafts 18, bevel gears 17 and pinions 16, thus causing a rotation of the worms 14.

The pitch of the worms is such that the worms cannot be rotated about their axes by the pressure that may exist between the teeth of the worm wheel 13 and the threads of the worms. The worms therefore, unless rotated by the mechanism just described, tend to lock the worm wheel 13 and body member 12 together for rotation in unison. Relative rotation between the body member 12 and worm wheel 13 is therefore under control of the gear 20.

Rotation of the gear 20 may be controlled in various ways. In the present instance, a brake drum 22 is provided. This drum, which is secured to or forms an integral part of the gear 20, is controlled by any appropriate means, such as a brake band 23. When this brake is released, the gear 20 is permitted to rotate in unison with the body member 12, under the influence of the pinions 19, and the worm wheel thus rotates in unison with the body member 12. A direct drive relation is thus established between the shafts 10 and 11. When the brake drum 22 and gear 20 are held against rotation by the action of the brake band 23, the worms 14 are rotated about their axes, and a relative rotation is established between the body member and the worm wheel 13 to a degree dependent upon the gear ratio between the pinions 19 and pinions 16. Thus assuming that the shaft 10 is driven at any definite speed, the shaft 11 may, through the mechanism just described, be made to rotate at either of two definite speeds dependent upon whether the brake drum is fully released or is locked against rotation. Various other intermediate speeds of the shaft 11 may also be obtained by permitting a slight slippage between the brake drum and band.

In some conditions of operation, it may be advantageous to provide means for locking the gear 20 to the shaft 11 for rotation therewith. For this purpose, any appropriate form of clutch mechanism may be employed. In the present instance, however, the body of the brake drum 22 is provided with a conical face 24 for cooperation with a clutch element 25 having a conical face 26 for contact with the face 24. The clutch element 25 is secured to the shaft 11 for rotation therewith, but is permitted a slight movement longitudinally thereof so that the faces 24 and 26 may be brought into and out of contact. The position of the clutch element 25 may be controlled by any appropriate means, such as a forked lever (not shown) engageable in the annular groove 27.

Various changes may be made in the embodiment of the invention hereinabove described, without departing from or sacrificing any of the advantages of the invention as defined in the following claims.

I claim:

1. In a device of the character described, the combination of driven and driving shafts, a worm wheel fixed to one of said shafts, a casing fixed to the other of said shafts, a pair of worms in said casing meshing with said worm wheel, a pair of stub shafts in said casing extending parallel to the axis of rotation thereof, bevel gearing between each stub shaft and one of said worms, a control gear rotatable about an axis substantially coincident with the axis of said casing, and a gear on each stub shaft meshing with said control gear.

2. In a device of the character described the combination of driven and driving shafts, a worm wheel fixed to one of said shafts, a casing fixed to the other of said shafts, a worm in said casing meshing with said worm wheel, a control element rotatable about the axis of rotation of said casing, gearing between said element and said worm, and a clutch and brake operable upon said control element to control rotation thereof and said worm.

In witness whereof, I hereunto subscribe my name this 24th day of June, 1921.

JOSEPH E. BOWER.